United States Patent [19]

Mahé

[11] 4,019,923

[45] Apr. 26, 1977

[54] POLYDISPERSIBLE PIGMENT COMPOSITIONS

[75] Inventor: Jean Mahé, Chantilly, France

[73] Assignee: Produits Chimiques Ugine Kuhlmann, Paris, France

[22] Filed: June 16, 1975

[21] Appl. No.: 587,020

[30] Foreign Application Priority Data

Apr. 7, 1974 France .................. 74.23263

[52] U.S. Cl. .................................. 106/308 Q
[51] Int. Cl.² ................................. C08J 3/00
[58] Field of Search ...................... 106/308 Q

[56] References Cited

UNITED STATES PATENTS

| | | | |
|---|---|---|---|
| 2,927,863 | 3/1960 | Morotta et al. | 106/308 Q X |
| 2,942,997 | 6/1960 | Bram et al. | 106/308 Q X |
| 3,094,499 | 6/1963 | Gassmann et al. | 106/308 Q X |
| 3,156,574 | 11/1964 | Gomm et al. | 106/308 Q X |
| 3,804,656 | 4/1974 | Kaliski et al. | 106/308 Q |
| 3,841,888 | 10/1974 | Belde et al. | 106/308 Q X |

FOREIGN PATENTS OR APPLICATIONS

| | | | |
|---|---|---|---|
| 295,070 | 1/1967 | Australia | 106/308 Q |
| 795,691 | 10/1968 | Germany | 106/308 Q |
| 966,850 | 8/1964 | United Kingdom | 106/308 Q |
| 762,439 | 11/1956 | United Kingdom | 106/308 Q |

*Primary Examiner*—Patrick P. Garvin
*Attorney, Agent, or Firm*—Beveridge, DeGrandi, Kline & Lunsford

[57] ABSTRACT

Readily dispersible pigment concentrate compositions are disclosed which can be easily dispersed in water, solvents and oils. The pigment compositions comprise 5 to 75% by weight of organic or inorganic pigment, 15 to 70% by weight of a solvent or mixture of solvents miscible with water and 7 to 35% by weight of a dispersing agent or mixture thereof. The dispersing agent is an addition product of ethylene oxide and castor oil, or an addition product of ethylene oxide and paranonylphenol or an addition product of ethylene oxide and a fatty alcohol and mixtures of such dispersing agents.

The pigment compositions can be incorporated into natural or synthetic resin compositions and, for example, are suited for leather-finishing compositions when mixed with proteinaceous or nitrocellulose film-forming materials.

6 Claims, No Drawings

POLYDISPERSIBLE PIGMENT COMPOSITIONS

The present invention relates to readily dispersible pigment concentrate compositions, and more especially to finely divided pigment pastes that are easily dispersible in various media such as water, solvents, oils.

According to the present invention, it has been found that it is possible to perform the operations of grinding and formation of pigment concentrates for paints in an aqueous medium or solvent medium by means of polyvalent compositions; that is, by using a selected group of dispersing agents. Cleaning with water of the apparatus or equipment used in making the pigment compositions may be carried out without difficulty. The number of presentations or marks is reduced.

The pigment compositions can easily be used by paint shops, especially small establishments, to prepare paints that can be applied as coatings. The compositions of this invention, when mixed with paint vehicles, do not require any special grinding or dispersion equipment. Mixing with water, solvent or oil to form the ultimate coating composition is performed in conventional apparatus.

The pigment composition of this invention may be used to prepare a variety of compositions containing natural and synthetic binders, polymers and film-forming materials. the specific vehicle chosen with which the pigment composition is compounded will depend upon a consideration of the nature of the support or surface to be coated or the quality sought for the final film or coating. Exemplary of the type of compositions which can be formed with the pigment concentrate of this invention are compositions for finishing leathers. The latter can be prepared from pigment compositions according to this invention by mixing with latexes of natural or synthetic resins, such as proteinaceous or nitrocellulose film-forming materials.

Compositions of this invention are characterized in that they comprise 5 to 75% by weight of organic or inorganic pigment, 15 to 70% by weight of a solvent or mixture of solvents miscible in water, and 7 to 35% by weight of a selected dispersing agent. The dispersing agents suitable for this invention are an addition product of ethylene oxide and castor oil, an addition product of ethylene oxide and para-nonylphenol or an addition product of ethylene oxide and a fatty alcohol. Generally, 4 to 10 moles of ethylene oxide are condensed with 1 mole of para-nonylphenol. The ratio of moles of ethylene oxide to castor oil can range from 20 to 60 to one. Usually, a mixture of such addition products may be used with convenience.

In the mixture of dispersing agents, the respective proportions of the addition product of ethylene oxide and castor oil and the addition product of polyoxyethylene and nonylphenol or fatty acid can vary in broad limits, such as 90 to 10% of the first to 10 to 90% for the other or others.

As fatty alcohols, there can be cited $C_6$ to $C_{20}$ alcohols and their mixtures such as, in particular, lauryl alcohol, arachidyl alcohol, linoleyl alcohol, ricinoleyl alcohol.

The solvents that can be used to prepare the concentrated pigment compositions according to the invention can be organic oxygenated solvents, for example, ketones, such as acetone, diacetone alcohol, ethers such as tetrahydrofuran, tetrahydropyran, dioxane, esters such as ethyl lactate, methylcellusolve acetate, methoxytriglycol acetate, ether alcohols such as methylcellosolve, 1-methoxy propanol, 2-(methoxy methoxy) ethanol, butycellosolve, carbitol, methyl carbitol, dipropylene glycol monomethylether, 2-butoxy 2-ethoxy ethanol. Preferably, methylcellosolve (mono-methyl ether of ethylene gylcol) and ethylcellosolve (monoethyl ether of ethylene glycol) are used.

The pigment compositions according to the invention can be prepared by making a paste of the finely divided, solid pigment in the solvent-dispersant mixture and grinding in a grinder suitable for grinding pastes. Alternatively, the pigment compositions may be made by forming a paste, diluting and grinding; the grinding may be performed in a grinder for liquid pigment compositions, such as a sand mill. These are known techniques and adjustment of proportions, solvent levels and mixing times are matters within the skill of the art.

A wide variety of organic and inorganic pigments can be used in practicing the invention; carbon blacks, iron oxides, chrome green, ochers, chrome yellow, chrome orange, molybdenum red, cadmium yellow, titanium white, phthalocyanine blues, indanthrene blue, phthalocyanine greens, toluidine reds, carmine red derived from naphthazol, lithol reds.

The pigment concentrate compositions thus obtained can be readily dispersed either in an aqueous medium, or in an organic solvent medium or oil medium.

The aqueous medium can be made up of aqueous suspensions or aqueous solutions of film-forming elements such as the latexes of natural or synthetic resins, caseinates or other film-forming proteinaceous materials (albumin) and colloids such as carboxymethylcellulose, methylcellulose, ethylcellulose, hydroxyethylcellulose, emulsified nitrocellulose lacquers. Wetting agents such as sodium and ammonium sulforicinates, triethanolamine and morpholine soaps that also act as buffers may be added.

The solvent medium can be made up of diluting and plasticizing solvents of nitrocellulose such as ketones, ethers and polyethers, ether alcohols, esters, alcohols and hydrocarbons, linseed and castor oil, the phthalates of butyl and alcohols of $C_6$ and $C_{20}$ carbon atoms, tricresylphosphate and camphor. By adding nitrocellulose to this solvent medium, there is obtained a nitrocellulose lacquer in which the film-forming element is nitrocellulose.

The following tables give, by way of illustration, examples of the compositions according to the invention. The symbol "P I" designates a product resulting from the condensation of 4 to 10 moles of ethylene oxide with a mole of p-nonylphenol. The symbol "P II" represents the product resulting from the condensation of 40 moles of ethylene oxide with a mole of castor oil. In the column "M" are indicated the amounts of material formed into a paste by kneading or mixing. In a column headed "D" the amount of solvent is indicated that is eventually added for dilution. These amounts are by weight.

|  | Ex.1 | | Ex.2 | | Ex.3 | | Ex.4 | | Ex.5 | |
|---|---|---|---|---|---|---|---|---|---|---|
|  | M | D | M | D | M | D | M | D | M | D |
| P I | 147 | | 86 | | 136 | | 85 | | 133 | |
| P II | 73 | | 180 | | 64 | | 40 | | 67 | |
| Methylcellosolve | 150 | | 158 | | 150 | | | | 50 | 100 |
| Ethylcellosolve | | | | 396 | | | 75 | 100 | | |
| Titanium oxide | 630 | | | | | | | | | |
| Phthalocyanine blue | | | 180 | | | | | | | |
| Red iron oxide | | | | | 650 | | | | | |
| Cadium yellow | | | | | | | 700 | | | |
| Molybdenum, red | | | | | | | | | 650 | |
|  | 1000 | 0 | 604 | 396 | 1000 | 0 | 900 | 100 | 900 | 100 |
| TOTAL | 1.000 | | 1.000 | | 1.000 | | 1.000 | | 1.000 | |

|  | Ex.6 | | Ex.7 | | Ex.8 | | Ex.9 | |
|---|---|---|---|---|---|---|---|---|
|  | M | D | M | D | M | D | M | D |
| P I | 130 | | 202 | | 156 | | 87 | |
| P II | 60 | | 95 | | 78 | | 184 | |
| Methylcellosolve | 150 | | 133 | 45 | | 296 | 164 | |
| Ethylcellosolve | | | | | 350 | | 100 | 308 |
| Chrome yellow | 660 | | | | | | | |
| Yellow iron oxide | | | 525 | | | | | |
| Carbon black ("Printex U") | | | | | 120 | | | |
| Pigment C.I. 12490 | | | | | | | 157 | |
|  | 1.000 | 0 | 955 | 45 | 704 | 296 | 692 | 308 |
| TOTAL | 1.000 | | 1.000 | | 1.000 | | 1.000 | |

Further variations will be apparent to those skilled in the art.

What is claimed is:

1. A pigment concentrate composition which comprises:
   5 to 75% by weight of an organic or inorganic finely divided pigment
   15 to 70% by weight of a solvent or mixture of solvents miscible with water
   7 to 35% by weight of a dispersing agent consisting of a product of addition of ethylene oxide and castor oil, and a product of addition of ethylene oxide and paranonylphenol.

2. A pigment concentrate composition as defined in claim 1 wherein the dispersing agent is a mixture of (1) an addition product of 4 to 10 moles of ethylene oxide and one mole of p-nonylphenol and (2) the addition product of 40 moles of ethylene oxide and one mole of castor oil.

3. A pigment concentrate composition as defined in claim 1 wherein the solvent is an oxygenated organic solvent miscible with water.

4. A pigment concentrate composition as defined in claim 1 wherein the solvent is selected from the group consisting of the mono-methyl ether of ethylene glycol, the mono-ethyl ether of ethylene glycol and mixtures thereof.

5. A pigment concentrate composition which comprises:
   5 to 75% by weight of an organic or inorganic finely divided pigment,
   15 to 70% by weight of an organic solvent or mixture of organic solvents miscible with water,
   7 to 35% by weight of a dispersing agent consisting of a product of addition of ethylene oxide and castor oil and a product of addition of ethylene oxide and para-nonylphenol.

6. A non-aqueous pigment concentrate composition which comprises:
   5 to 75% by weight of an organic or inorganic finely divided pigment,
   15 to 70% by weight of an organic solvent or mixture of organic solvents miscible with water,
   7 to 35% by weight of a dispersing agent consisting of a product of addition of ethylene oxide and castor oil and a product of addition of ethylene oxide and para-nonylphenol.

* * * * *